(12) United States Patent
Ohtsuka (10) Patent No.: US 9,064,487 B2
(45) Date of Patent: Jun. 23, 2015

(54) IMAGING DEVICE SUPERIMPOSING WIDEBAND NOISE ON OUTPUT SOUND SIGNAL

(71) Applicant: Panasonic Corporation, Osaka (JP)

(72) Inventor: Yoshio Ohtsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 12 days.

(21) Appl. No.: 13/863,660

(22) Filed: Apr. 16, 2013

(65) Prior Publication Data
US 2013/0271647 A1      Oct. 17, 2013

(30) Foreign Application Priority Data

Apr. 17, 2012  (JP) ................................. 2012-093621

(51) Int. Cl.
| | | |
|---|---|---|
| *G10K 11/175* | (2006.01) | |
| *G03B 31/00* | (2006.01) | |
| *G10L 21/0208* | (2013.01) | |
| *H04R 3/00* | (2006.01) | |
| *G03B 17/14* | (2006.01) | |
| *H04R 29/00* | (2006.01) | |

(52) U.S. Cl.
CPC .............. *G10K 11/175* (2013.01); *G03B 31/00* (2013.01); *G10L 21/0208* (2013.01); *H04R 3/00* (2013.01); *H04R 29/00* (2013.01); *H04R 2460/01* (2013.01); *H04R 2499/11* (2013.01); *G03B 17/14* (2013.01)

(58) Field of Classification Search
CPC ...... G10K 11/175; G03B 31/00; G03B 17/14; H04N 5/2253; H04N 5/23209; H04R 3/00; G10L 21/0208
USPC ......................................................... 348/360
See application file for complete search history.

(56) References Cited

U.S. PATENT DOCUMENTS

| | | | |
|---|---|---|---|
| 5,774,842 A | 6/1998 | Nishio et al. | |
| 2004/0203454 A1* | 10/2004 | Rogers ........................ | 455/67.13 |
| 2013/0163779 A1* | 6/2013 | Yamaguchi et al. ......... | 381/73.1 |
| 2013/0170662 A1* | 7/2013 | Koga et al. ................... | 381/73.1 |

FOREIGN PATENT DOCUMENTS

| | | | | |
|---|---|---|---|---|
| JP | 5-158494 | 6/1993 | | |
| JP | 8-293799 | 11/1996 | | |
| JP | 2011-77604 | 4/2011 | | |
| JP | 2011077604 | * 4/2011 | ............. | H04N 5/225 |

* cited by examiner

*Primary Examiner* — Paul Berardesca
(74) *Attorney, Agent, or Firm* — Panasonic Patent Center (57) ABSTRACT

A sound pickup device includes a detector configured to detect attachment of an external apparatus, a sound pickup unit configured to pick up a sound and output a sound signal, and a noise processor configured to, in response to the detection of attachment of an external appliance, add a noise signal to the sound signal output from the sound pickup unit and output the sound signal including the noise signal added thereto.

2 Claims, 8 Drawing Sheets

| LENS TYPE | MASKING SETTING |
|---|---|
| LENS 1 | A |
| LENS 2 | B |
| LENS 3 | C |
| ⋮ | ⋮ |
| LENS 10 | A |
| ⋮ | ⋮ |

| LENS TYPE | MASKING SETTING |
|---|---|
| LENS 1 | A |
| LENS 2 | B |
| LENS 3 | C |
| .... | .... |
| LENS 10 | A |
| .... | .... |

IMAGING DEVICE SUPERIMPOSING WIDEBAND NOISE ON OUTPUT SOUND SIGNAL

BACKGROUND

1. Technical Field

The present disclosure relates to a sound pickup device and an imaging device which pick up a sound and record the sound as a sound signal.

2. Related Art

There are some imaging devices provided with sound pickup devices that can be attached with interchangeable lenses. In such an imaging device, the sound pickup device could accidentally record a driving sound of the interchangeable lens. Therefore, various configurations for reducing that kind of noise have been known (for example, see JP 2011-77604 A). JP 2011-77604 A discloses a configuration of obtaining noise data stored in the interchangeable lens and cancelling the noise from an input sound signal based on the noise data.

SUMMARY

In recent years, noise reduction technique for noises produced in a circuit of an imaging device have been developed. For that reason, when an operation noise such as the driving sound of the interchangeable lens is recorded, the noise has become more unpleasant to the ear than that in conventional devices.

An object of the present disclosure is to provide a sound pickup device that improves the quality of sound data in terms of audibility.

The sound pickup device disclosed here includes a detector configured to detect attachment of an external apparatus, a sound pickup unit configured to pick up a sound and output a sound signal, and a noise processor configured to, in response to the detection of attachment of an external apparatus, add a noise signal to the sound signal output from the sound pickup unit and output the sound signal added with the noise signal.

DETAILED DESCRIPTION OF EMBODIMENTS

First Embodiment

An embodiment will be described with reference to the drawings. The same or similar reference signs are provided to the same or similar parts in the drawings below. However, the drawings are made for schematic purposes and may have ratios and the like of respective dimensions different from those of the real dimensions. Therefore, specific dimensions and the like should be decided by taking account of the following description. Further, it is needless to say that relationship or ratios of the dimensions may partially differ from each other also among the drawings.

In the following embodiment, a digital camera is taken as an example of an imaging device which is an electronic device equipped with a sound pickup device. In the following description, the direction toward a subject from the imaging device in a normal posture (hereinafter, also referred to as "horizontal shooting posture") is expressed as "forward". The direction opposite to the subject is expressed as "backward". The vertically upward direction is expressed as "upward". The vertically downward direction is expressed as "downward". The rightward direction from the imaging device facing the subject is expressed as "rightward". The leftward direction from the imaging device facing the subject is expressed as "leftward".

Figure 1:
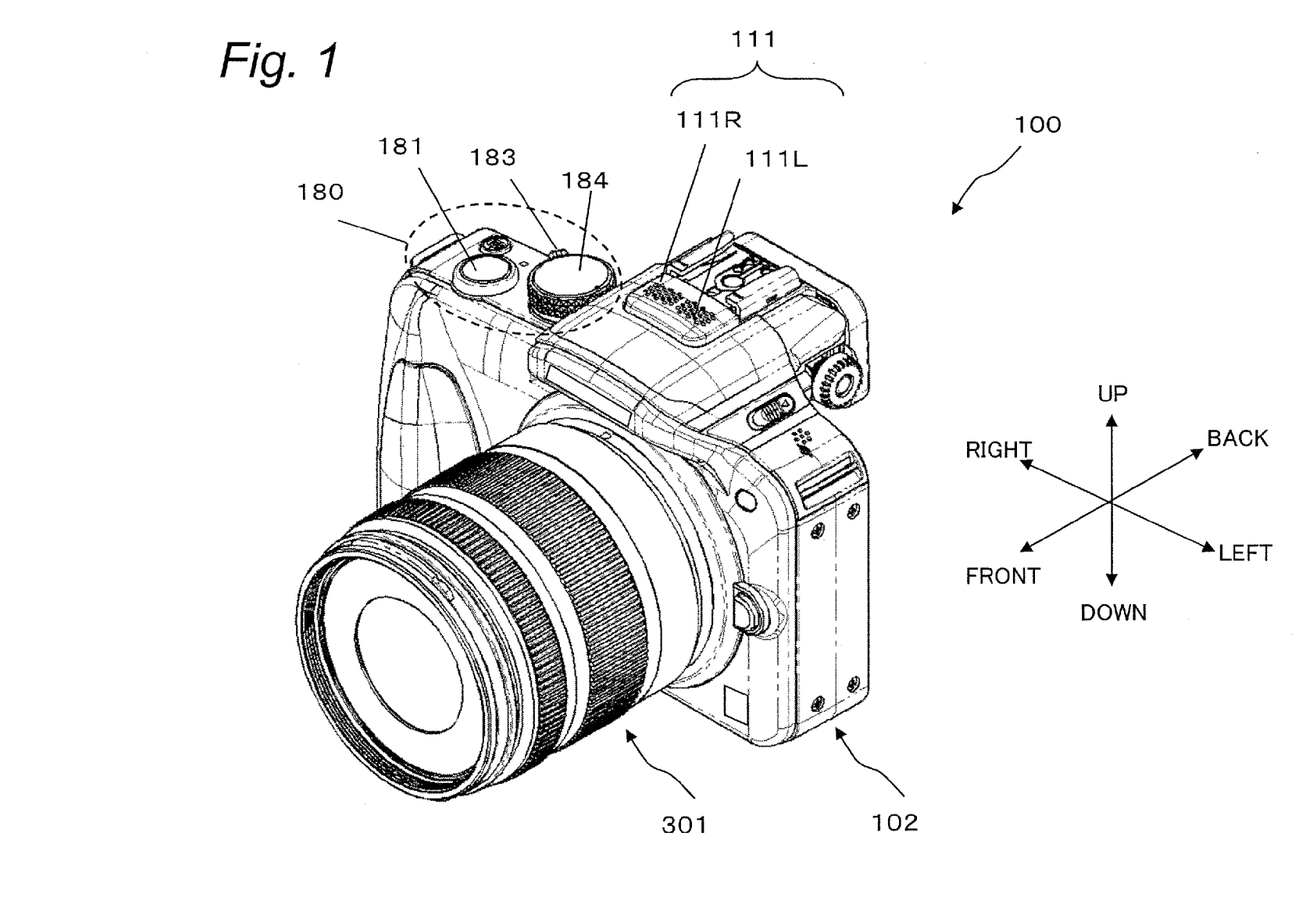
FIG. 1 is a front view of a digital camera according to a first embodiment.

As depicted in FIG. 1, a digital camera 100 of the first embodiment has a microphone unit 111 and picks up sounds with the microphone unit 111 while shooting a moving image to record the sound while recording the image. The configuration and the operations of the digital camera 100 will be described below.

1. Configuration

The configuration of the digital camera 100 will be described below with reference to the drawings.

1-1. Configuration of Digital Camera

FIG. 1 is a perspective view of the digital camera 100. The digital camera 100 has a camera body 102 and an interchangeable lens 301. Further, the digital camera 100 has an operation unit 180 including a release button 181, a power switch 183, and a mode dial 184 on the top surface.

The digital camera 100 also has a sound pickup unit 111 on the top surface. The sound pickup unit 111 includes two microphones of a microphone 111L and a microphone 111R. The microphone 111L and the microphone 111R are arranged side by side in the horizontal direction on the top surface of the body of the digital camera 100.

Figure 2:
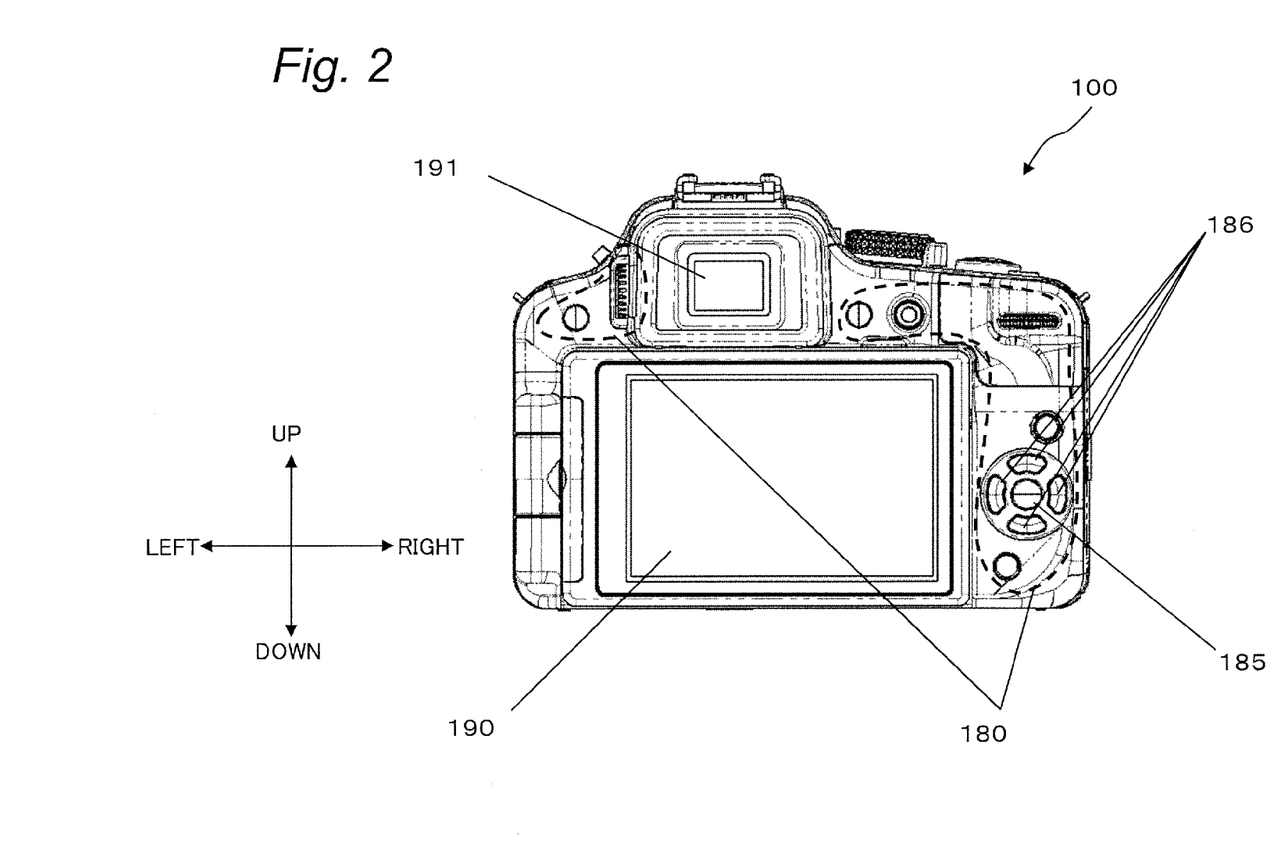
FIG. 2 is a rear view of the digital camera according to the first embodiment.

FIG. 2 is a rear view of the digital camera 100. The digital camera 100 has an operation unit 180 including a center button 185 and directional buttons 186 on the rear. The digital camera 100 also has a display unit 190 and a view finder 191 on the rear.

Figure 3:
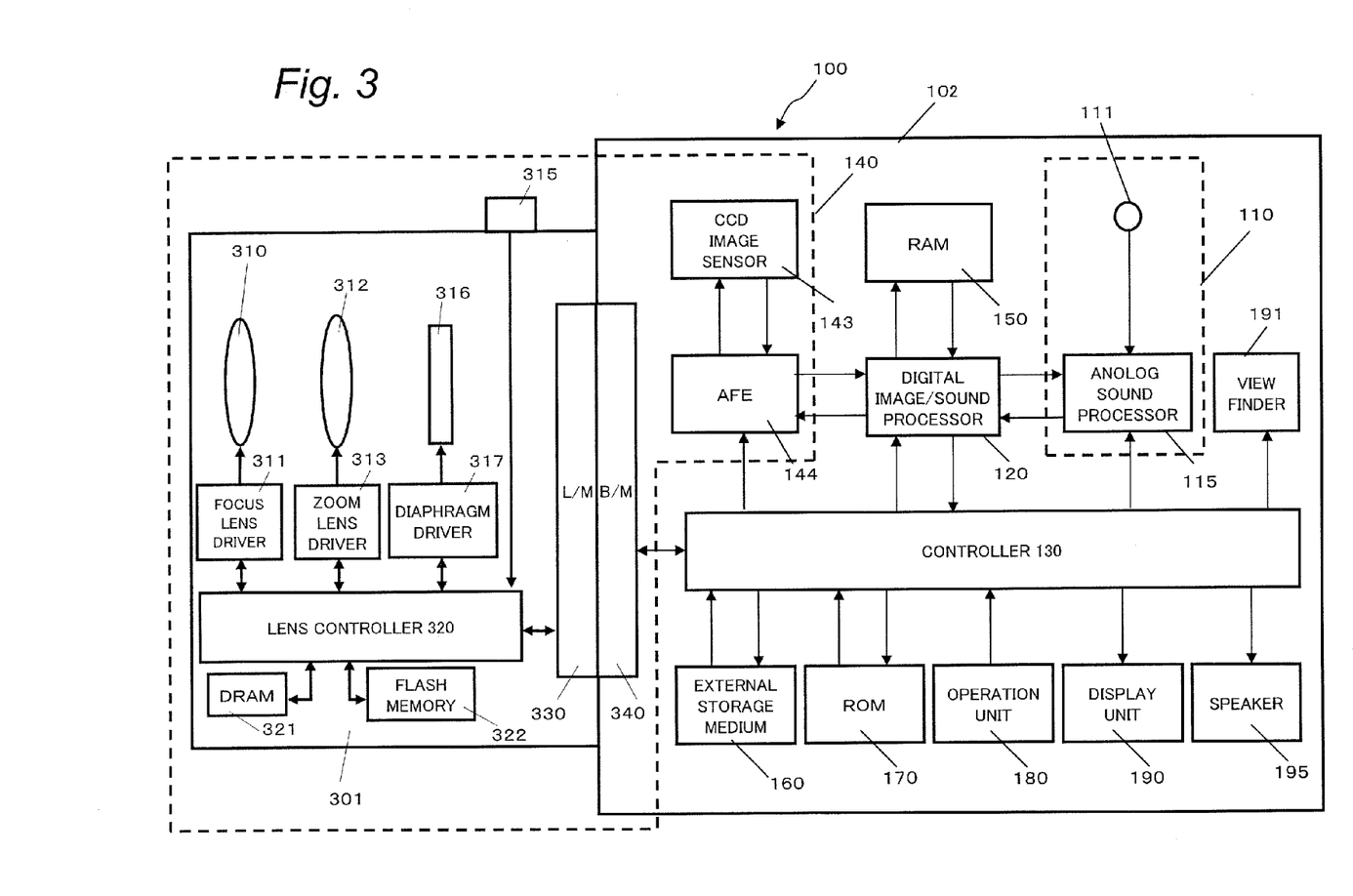
FIG. 3 is a block diagram illustrating an electrical configuration of the digital camera according to the first embodiment.

FIG. 3 is an electric block diagram of the digital camera 100. The digital camera 100 has the camera body 102 and the interchangeable lens 301. The camera body 102 has an image inputting system 140, a sound inputting system 110, a digital image/sound processor 120, a controller 130, a RAM 150, an external storage medium 160, a ROM 170, the operation unit 180, the display unit 190, the view finder 191, and a speaker 195.

The digital camera 100 generates image information and a sound signal from optical information and sound information obtained from external sources. The image information is generated by the image inputting system 140. The sound signal is generated by the sound inputting system 110. The generated image information and sound signal are subjected to A/D conversion, subjected to the respective types of processing in the digital image/sound processor 120, and then recorded in the external storage medium 160 such as a memory card. The image information recorded in the external storage medium 160 is displayed on the display unit 190 and/or the view finder 191 in response to a user's operation received on the operation unit 180. The sound signal recorded in the external storage medium 160 is output from the speaker 195 in response to a user's operation received on the operation unit 180.

The respective components of the digital camera 100 will be described in detail below with reference to FIG. 1 to FIG. 3.

The image inputting system 140 has the interchangeable lens 301, a CCD image sensor 143, and an AFE (analog front end) 144.

The interchangeable lens 301 includes an optical system having a plurality of lenses. The interchangeable lens 301 has a lens controller 320, a lens mount 330, an optical system including a focus lens 310 and a zoom lens 312, a focus lens driver 311, a zoom lens driver 313, a diaphragm 316, a diaphragm driver 317, an operation ring 315, a DRAM 321, a flash memory 322, and the like.

The lens controller 320 controls the entire interchangeable lens 301. The lens controller 320 can control the zoom lens driver 313 to drive the zoom lens 312 in response to a user's operation received on the operation ring 315. The lens controller 320 is connected to the DRAM 321 and the flash memory 322 to/from which the lens controller 320 can write/read information, as required. Further, the lens controller 320 can communicate with the controller 130 of the camera body 102 via the lens mount 330. Incidentally, the controller 130 may be implemented by a hardwired electronic circuit or a microcomputer using a program.

The lens mount 330 functions as a connection member for mechanically and electrically connecting the interchangeable lens 301 with the camera body 102 in cooperation with a body mount 340 of the camera body 102. Once the interchangeable lens 301 and the camera body 102 are mechanically and electrically connected with each other, the lens controller 320 and the controller 130 can communicate with each other.

The DRAM 321 is used as a working memory by the lens controller 320 in the respective types of control. The flash memory 322 stores a program, parameters, lens data and the like used by the lens controller 320 in the respective types of control.

The focus lens 310 is a lens for changing the focus state of the subject image incident through the optical system of the interchangeable lens 301 and is formed on the CCD image sensor 143. The focus lens 310 may be constituted a single lens or any number of lenses or a single group or any number of lens groups. The focus lens driver 311 drives the focus lens 310 to move forward and backward along the optical axis of the optical system according to a control signal sent from the lens controller 320. The focus lens driver 311 may be implemented by, for example, a stepping motor, a DC motor, an ultrasonic motor or the like.

The zoom lens 312 is a lens for changing the magnification of a subject image which is formed through the optical system of the interchangeable lens 301. The zoom lens 312 may be constituted of a single lens or any number of lenses or a single lens group or any number of lens groups. The zoom lens driver 313 drives the zoom lens 312 to move forward and backward along the optical axis of the optical system according to the control signal sent from the lens controller 320. The zoom lens driver 313 may be implemented by, for example, a stepping motor, a DC motor, an ultrasonic motor or the like.

The diaphragm 316 is constituted of a plurality of mechanical blades which are movable to open and close. The diaphragm 316 is an adjusting member to adjust the light quantity incident to the optical system of the interchangeable lens 301. The diaphragm driver 317 drives the mechanical blades of the diaphragm 316 to change the open/close state of them based on the control signal sent from the lens controller 320. The diaphragm driver 317 may be implemented by, for example, a stepping motor, a DC motor, an ultrasonic motor or the like.

The operation ring 315 is an operation member installed on the outer surface of the interchangeable lens 301. The operation ring 315 is adapted to turn relative to the interchangeable lens 301. The turning position and the turning speed of the operation ring 315 are detected by a detector (not shown) and sent to the lens controller 320. The lens controller 320 can supply a drive control signal to the zoom lens driver 313 based on the notified turning position and turning speed of the operation ring 315. The lens controller 320 supplies the drive control signal to the zoom lens driver 313 to drive the zoom lens 312 in response to an operation performed on the operation ring 315.

The body mount 340 functions as a connection member for mechanically and electrically connecting the interchangeable lens 301 with the camera body 102 in cooperation with the lens mount 330 of the interchangeable lens 301. Once the interchangeable lens 301 and the camera body 102 are mechanically and electrically connected with each other, the lens controller 320 and the controller 130 can communicate with each other. The body mount 340 sends an exposure synchronizing signal and other control signals received from the controller 130 to the lens controller 320 through the lens mount 330. The body mount 340 also sends the signals, which are received from the lens controller 320 via the lens mount 330, to the controller 130.

The CCD image sensor 143 captures a subject image formed through the interchangeable lens 301 and generates image information. The CCD image sensor 143 has many photodiodes in a two-dimensional array (in matrix) on its light receiving surface. The CCD image sensor 140 also has R, G, and B primary color filters arranged correspondingly to the respective photodiodes. The R, G, and B primary color filters are arranged in a predetermined array structure. The light from the subject to be captured passes through the interchangeable lens 301, and then is formed on the light receiving surface of the CCD image sensor 143. The formed subject image is converted into image information classified into R, G, and B according to the light quantities incident on the respective photodiodes. As a result, image information indicating the entire subject image is generated. The respective photodiodes correspond to the pixels of the CCD image sensor 143. However, the color information practically output from each photodiode is the primary color information of any of R, G, or B. Therefore, the color to be developed on each pixel is generated in the digital image/sound processor 120 at a subsequent stage based on the primary color information (color, the light quantity) output from the photodiode corresponding to each pixel and photodiodes around the photodiode. Meanwhile, the CCD image sensor 143 can generate a new frame of image information for every certain period of time while the digital camera 100 is in the shooting mode.

The AFE 144 performs noise suppression by correlated double sampling, amplification to the input range of an A/D converter by an analog gain controller, and the A/D conversion by an A/D convertor on the image information read out from the CCD image sensor 143 to generate image information. Then, the AFE 144 outputs the image information to the digital image/sound processor 120.

The sound inputting system 110 has the sound pickup unit 111 and an analog sound processor 115. The sound pickup unit 111 includes the microphones 111L, and 111R. The sound pickup unit 111 converts sounds into electric signals by the microphones 111L and 111R and inputs the electric signals into the analog sound processor 115. The analog sound processor 115 performs the A/D conversion on the processed sound signals by the A/D converter to generate sound signals and outputs the sound signals to the digital image/sound processor 120.

The digital image/sound processor 120 performs various types of processing on the image information output from the AFE 144 and the sound signals output from the analog sound processor 115. For example, the digital image/sound processor 120 performs processing such as gamma correction, white balance correction, flaw correction, and coding processing on the image information according to a command from the controller 130. Further, the digital image/sound processor 120 performs various types of processing on the sound signals according to an instruction from the controller 130. The digital image/sound processor 120 may be implemented by a hardwired electronic circuit, a microcomputer using a program, or the like. The digital image/sound processor 120 may be formed on a semiconductor chip together with the controller 130 and the like.

The digital image/sound processor 120 performs directional synthesis processing, as audio zoom processing, by performing arithmetic processing on the output from the microphone unit 111.

The display unit 190 is placed on the rear of the digital camera 100. In the present embodiment, the display unit 190 is a liquid crystal display. The display unit 190 displays an image based on image information processed in the digital image/sound processor 120. The display unit 190 displays the images such as a through image and a reproduction image. The through image is frames of image continuously generated anew for every certain period of time by the CCD image sensor 143. In general, when the digital camera 100 is set to the shooting mode and also in a standby state in which the digital camera 100 is not shooting a still image or in a moving image shooting state, the digital image/sound processor 120 generates the through image from the image information generated by the CCD image sensor 143. By referring to the through image displayed on the display unit 190, the user can take an image of a subject while checking the composition of the image. The reproduction image is generated by the digital image/sound processor 120 when the digital camera 100 is in a reproduction mode. The reproduction image is an image which is generated by reducing the image of high pixel density recorded in the external storage medium 160 or the like to an image of low pixel density to adjust it to the size of the display unit 190. The image information of high pixel density recorded in the external storage medium 160 is displayed by the digital image/sound processor 120 based on the image information generated by the CCD image sensor 143 in response to reception of a user's predetermined operation on the release button 181. The speaker 195 outputs sounds based on the sound signals recorded in the external storage medium 160. The displayed contents displayed on the display unit 190 can be also displayed on the view finder 191.

The controller 130 performs integral control over the operations of the entire digital camera 100.

The ROM 170 stores programs related to autofocus control (AF control), auto exposure control (AE control), electronic flash control, and the like, as well as programs for performing integral control over the operations of the entire digital camera 100 to be executed by the controller 130. The ROM 170 stores the respective conditions and settings of the digital camera 100. In the present embodiment, the ROM 170 is a flash ROM.

The controller 130 may be implemented by a hardwired electronic circuit, a microcomputer using a program, or the like. The controller 130 may be integrated into a semiconductor chip together with the digital image/sound processor 120 and the like. The ROM 170 needs not to be provided outside the controller 130 (separate from the controller 130) and may be provided inside the controller 130.

The RAM 150 functions as a working memory for the digital image/sound processor 120 and the controller 130. The RAM 150 may be implemented by an SDRAM, a flash memory, or the like. The RAM 150 also functions as an internal memory for recording the image information and the sound signals.

The external storage medium 160 is an external memory containing a nonvolatile storage element such as a flash memory. The external storage medium 160 can record data such as the image information and the sound signals to be processed in the digital image/sound processor 120.

The operation unit 180 collectively refers to an operational interface such as operation buttons and an operation dial provided on the exterior of the digital camera 100. The operation unit 180 receives a user's operation. For example, the operation unit 180 includes the release button 181, the power switch 183, the mode dial 184, the center button 185, and directional buttons 186 illustrated in FIGS. 1, 2, and 3. When the operation unit 180 receives a user's operation, the operation unit 180 sends the controller 130 signals instructing the respective operations.

The release button 181 is a push button which works in two stages of the half-press state and the full-press state. In response to the user's half-press operation on the release button 181, the controller 130 performs the AF (Auto Focus) control and/or the AE (Auto Exposure) control and the like to decide on the shooting conditions. In the AF control, the digital image/sound processor 120 calculates a contrast value in a predetermined area of image information, and the controller 130 performs feedback control to obtain the maximum contrast value by driving the interchangeable lens 301 based on the calculated contrast value. As a result of the AF control, the controller 130 can obtain the focal distance to the target subject of the AF control. As a result of the AF control, the interchangeable lens 301 can form the image of the target subject of the AF control on the CCD image sensor 143. Subsequently, when the release button 181 is full pressed by the user, the controller 130 records the image information captured at the moment of the full-press operation in the external storage medium 160 or the like.

The power switch 183 is a slide switch for switching ON/OFF the power supply for the respective components of the digital camera 100. When the power switch 183 is slid to the right by the user in the power OFF state, the controller 130 supplies power to the respective components of the digital camera 100 to activate them. When the power switch 183 is slid to the left by the user in the power ON state, the controller 130 stops the power supply to the respective components of the digital camera 100.

The mode dial 184 is a rotary dial. When the mode dial 184 is dialed by the user, the controller 130 switches the operation mode of the digital camera 100 to the operation mode corresponding to the current position of the mode dial 184. The operation mode is, for example, the auto shooting mode, the manual shooting mode, the scene selection mode, and the like. Here, it is assumed that the operation mode collectively refers to the auto shooting mode, the manual shooting mode, and the scene selection mode.

The center button 185 is a push button. When the center button 185 is pressed by the user while the digital camera 100 is in the shooting mode or the reproducing mode, the controller 130 displays a menu screen on the display unit 190. The menu screen is a screen for the user to select among various settings for shooting conditions and reproducing conditions. When the value of the setting item of the respective conditions is selected by the user and the center button 185 is pressed, the selected value is set as a value of the setting item. The decided setting is stored in the ROM 170.

The directional buttons 186 includes four push buttons arranged in the upward/downward/leftward/rightward directions. By pressing any one of the directional buttons 186, the user can select the value of the setting item of the respective conditions displayed on the menu screen.

The digital camera 100 is an example of the imaging device of the present disclosure. The interchangeable lens 301 is an example of the interchangeable lens of the present disclosure. The sound pickup unit 111 is an example of the sound pickup unit of the present disclosure. The digital image/sound processor 120 is an example of the noise addition unit of the present disclosure. The controller 130 is an example of the detector of the present disclosure. The focus lens driver 311, the zoom lens driver 313, and the iris driver 317 are examples of the driver of the present disclosure. Further, the sound pickup device of the present disclosure is configured to include the sound pickup unit 111, the controller 130, and the digital image/sound processor 120.

2. Operation

The operations of the digital camera 100 of the embodiment will be outlined. When the power of the camera body 102 with the interchangeable lens 301 attached thereto is switched on by the user's operation on the power switch 183 of the camera body 102, power is supplied in the digital camera 100 and then the respective initializations are performed.

2-1. Initial Operation

The initial operation in the case where the power of the camera body 102 with the interchangeable lens 301 attached thereto is switched on will be described with reference to FIG. 4.

Figure 4:
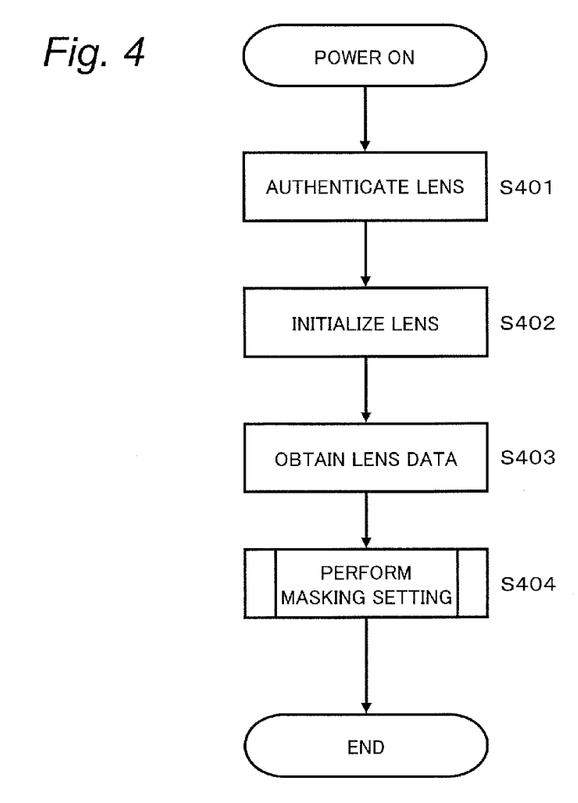
FIG. 4 is a flow chart describing a flow of an initial operation of the digital camera according to the first embodiment.

FIG. 4 is a flow chart describing a flow of an initial operation for preparing for the image capturing in response to switching on of the power of the digital camera 100.

When the user switches on the power switch 183 of the camera body 102 to which the interchangeable lens 301 is attached, power is supplied from the camera body 102 to the respective components of the interchangeable lens 301 via the body mount 340 and the lens mount 330.

Then, the controller 130 of the camera body 102 requests authentication information of the interchangeable lens 301 from the lens controller 320 (S401). The authentication information of the interchangeable lens 301 includes information indicating what kind of interchangeable lens is attached such as identification information and the like of the interchangeable lens. The lens controller 320 responds to the lens authentication request issued from the controller 130 by sending the authentication information to the camera body 102. As a result, the controller 130 can complete the authentication of the lens and recognize what kind of interchangeable lens 301 is attached to the camera body 102.

Next, the controller 130 requests the lens controller 320 to perform the initialization operation (S402). In response to the request, the lens controller 320 performs the initialization operation such as reset of the position of the focus lens 310, reset of the position of the zoom lens 312, and rest of the diaphragm 316. Then, the lens controller 320 sends the controller 130 a response indicating that the initialization operation of the lens has been completed. From that response, the controller 130 can recognize that the lens has been initialized.

Next, the controller 130 requests lens data from the lens controller 320 (S403). The lens data is stored in the flash memory 322 of the interchangeable lens 301. In response to the lens data request issued from the controller 130, the lens controller 320 reads the lens data from the flash memory 322. Then, the lens controller 320 sends the read lens data the controller 130. Here, the lens data includes a characteristic value specific to the interchangeable lens 301 such as the lens type, the f-number, the focus controllable range, and information on the operating members. With the above described operation, the controller 130 completes obtaining of the lens data of the attached interchangeable lens 301.

Next, the controller 130 performs masking setting to be used for sound recording in shooting a moving image based on the obtained data of the lens model (S404). The masking setting will be described in detail later.

As described above, after requesting and responding with the necessary data and, further completing the masking setting between the camera body 102 and the interchangeable lens 301 as will be described in detail below, the camera body 102 and the interchangeable lens 301 finishes the initial operation.

2-2. Masking Setting

Figure 5:
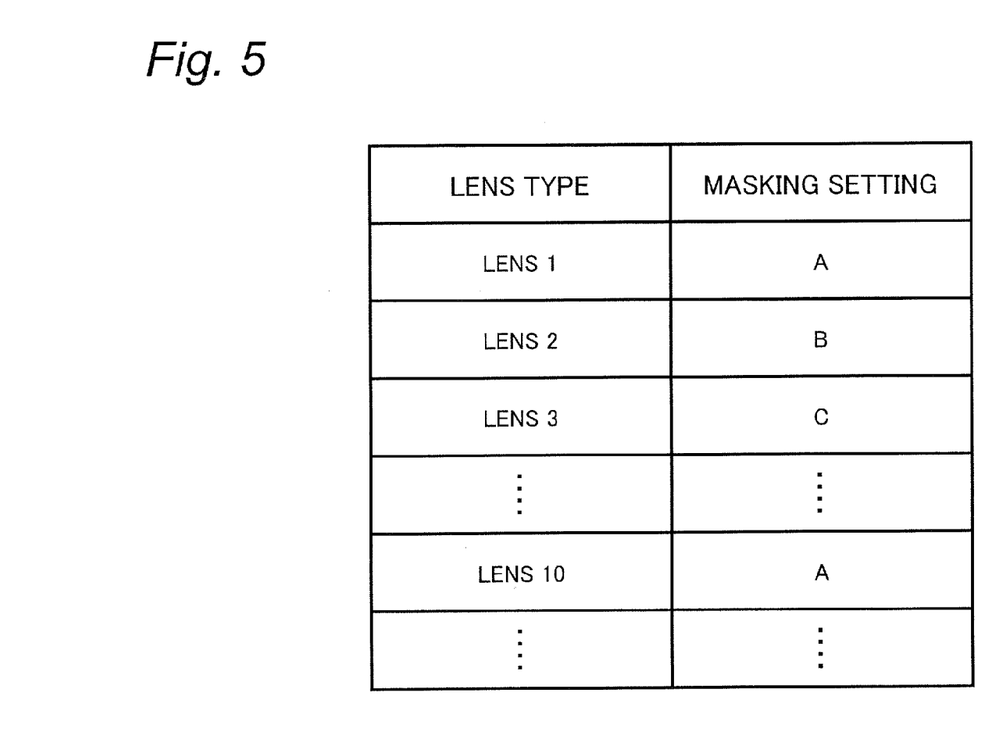
FIG. 5 is a diagram illustrating a masking setting table of the digital camera according to the first embodiment.

Hereinafter, the masking setting will be described. FIG. 5 is a diagram illustrating a masking setting table used for performing the masking setting (step S404 of FIG. 4). The masking setting table is a table associating the lens type with settings for masking. Note that the lens type is information identifying the model (type name) of the interchangeable lens. The masking setting table of FIG. 5 is previously stored in the ROM 170. The controller 130 compares the data of the lens type obtained from the interchangeable lens 301 based on the lens data, with the masking setting table of FIG. 5 previously stored in the ROM 170, and selects the setting of masking associated with the lens type. In the example of FIG. 5, when the lens type is "lens 1", the controller 130 selects "A" as the masking setting. When the lens type is "lens 2", the controller 130 selects "B" as the masking setting. When the lens type is "lens 3", the controller 130 selects "C" as the masking setting. As such, the controller 130 selects the masking setting associated with the lens type by referencing the masking setting table. Meanwhile, the masking setting may be shared with a plurality of lens types. That is, when the lens type is "lens 10", it is also possible to set the masking setting "A" which is the same as the masking setting selected in the case where the lens model is "lens 1". According to the masking setting, the level of the noise signal added to the picked up sound signal is changed (to be detailed later).

Figure 6A:
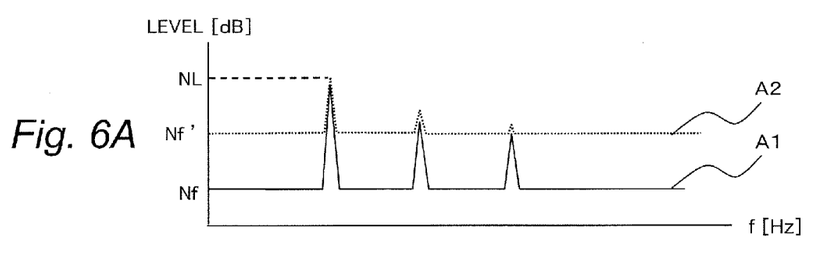
FIGS. 6A to 6C are diagrams illustrating specific examples of masking setting of the digital camera according to the first embodiment.
Figure 6B:
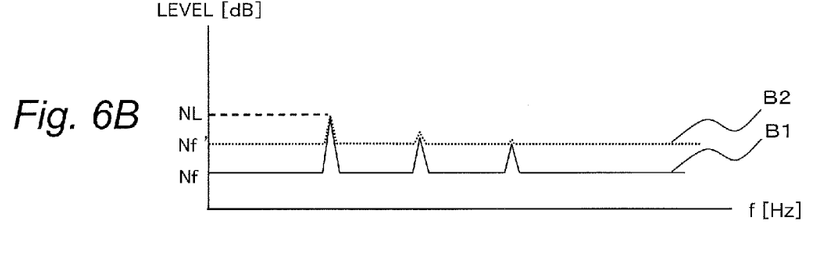
Figure 6C:
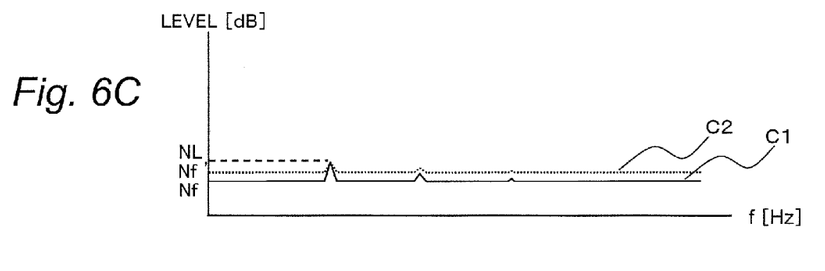

FIGS. 6A to 6C are diagrams illustrating specific examples of the masking setting. The three diagrams of FIGS. 6A, 6B, and 6C represent masking settings for different lens types, respectively. FIGS. 6A, 6B, and 6C correspond to the masking settings "A", "B", and "C" in the masking setting table of FIG. 5, respectively. Also, each diagram is a graph schematically representing in the frequency domain the sound signal picked up during recording of a moving image, the abscissa represents the frequency of the sound signal with the unit [Hz] and the ordinate represents the level of the sound signal with the unit [dB]. A noise which is contained in the sound signal and is recorded in a silent state during recording of a moving image is referred to as "noise floor" and its level is represented by Nf [dB]. A noise caused by the interchangeable lens 301 attached to the camera body 102, which is contained in the sound signal and is recorded during recording of a moving image, is referred to as "lens noise", and the peak value on the frequency axis of its level is represented by NL [dB]. The lens noise is, for example, a noise which is produced when the focus lens driver 311 of the interchangeable lens 301 drives the focus lens 310. The lens noise may also be a driving sound for the zoom lens 312, a driving sound for the diaphragm 316, or the like.

It is generally known that a noise having peaks at specific frequencies would be unpleasant to the ear and likely to be recognized as a noise. It is also generally known that when a wide bandwidth noise which distributes over a wide frequency band (for example, white noise) is superimposed on (added to) the noise having peaks at specific frequencies, the noise having peaks at specific frequencies is masked by the wideband noise and becomes less distinctive to the ear. A process of making the noise having peaks at specific frequencies less distinctive to the ear by superimposing a wideband noise on the noise is called a "masking process". An effect of the masking process to make the noise which peaks at a specific frequency less distinctive to the ear is called a "masking effect". In the case of FIG. 6A, a difference between Nf and NL, i.e., (NL−Nf) is recognized as a highly audible noise, for a waveform A1. A waveform obtained by superimposing a wideband noise at a certain level on the waveform A1 is a waveform A2. Due to the superimposed wideband noise, the waveform A1 has the level of the noise floor Nf' [dB]. A difference between Nf' and NL, i.e., (NL−Nf') is recognized as a highly audible noise for the waveform A2. The magnitude relation between (NL−Nf') and (NL−Nf) is shown below.

$$(NL-Nf') < (NL-Nf) \quad (1)$$

From the above equation, it is understood that the lens noise is less audible to the ear in the waveform A1 than in the waveform A1. Note, the wideband noise is a noise which distributes over wide frequency band (ex. white noise). The level of the wideband noise is set to the level at which the user does not perceive the noise as being unpleasant. The level of the wideband noise can be practically decided as a result of experiment or the like.

However, increasing Nf' is beneficial to the masking effect but has also disadvantage. That is, the disadvantage is a decrease of the SN ratio. A larger SN ratio enables accurate recording of a small signal, and therefore, faithful reproduction of even a small sound from the sound signals is possible, which improves the sound quality. When the wideband noise is superimposed to increase Nf', the SN ratio decreases, which lowers the recorded sound quality. Therefore, in terms of the SN ratio, it is desirable to make the value of Nf' as small as possible according to the value of NL.

In the case of FIG. 6B, the value of NL is smaller than that in the case of FIG. 6A. Therefore, a wideband noise at the level lower than that of the wideband noise to be superimposed in FIG. 6A is superimposed. As a result, the value of Nf' is set smaller than that in the case of FIG. 6A. In this case the relation of the equation (1) holds true, and thus the lens noise is less audible to the ear in a waveform B2 than in a waveform B1.

In the case of FIG. 6C, the value of NL is even smaller than that in the case of FIG. 6B. Therefore, a wideband noise at the level lower than that of the wideband noise to be superimposed in FIG. 6B is superimposed. As a result, the value of Nf' is set smaller than that in the case of FIG. 6B. In this case the relation of the equation (1) also holds true, and thus the lens noise is less audible to the ear in a waveform C2 than in a waveform C1.

When the value of (NL−Nf) is originally small and, therefore, the lens noise is not perceived to be uncomfortable, it is not necessary to superimpose the wideband noise. To describe it by taking an example of FIG. 6C, the waveform C2 may be set the same as the waveform C1 with Nf' equal to Nf without the wideband noise superimposed. The NL is a value dependent on the interchangeable lens 301 and differs for each lens type. Some lens types have big NL values, while other lens types have small NL values. Since the correlation between the lens type and the NL can be previously checked, the masking process according to the lens type can be previously set.

That is, a masking setting table for setting the masking process to set big Nf' for the lens type which has a big NL and setting the masking process to set small Nf' for the lens type which has a small NL is prepared. With that kind of masking setting table, it is possible to increase the width of raising the noise floor by superimposing a relatively high level wideband noise in the case where an interchangeable lens which produces a relatively larger lens noise is attached. On the other hand, with that kind of masking setting table, it is possible to make the width of raising the noise floor small by superimposing a relatively low level wideband noise (in some cases, not superimposing a wideband noise), when an interchangeable lens which produces a relatively small lens noise is attached. The masking setting table prepared in advance is stored in the ROM 170. Data of the masking setting table may be updated as required, when the lens type increases.

2-3. Operation in Moving Image Shooting Mode

The operations of the digital camera 100 of the embodiment in the moving image shooting mode will be described. The digital camera 100 displays the through image on the display unit 190 in the standby state in the moving image shooting mode or in the moving image shooting state in which a moving image is taken. First, a flow of the overall operation in the moving image shooting mode will be described below with reference to FIG. 7, and then, a flow of an operation of recording sounds in shooting a moving image will be described with reference to FIG. 8.

Figure 7:
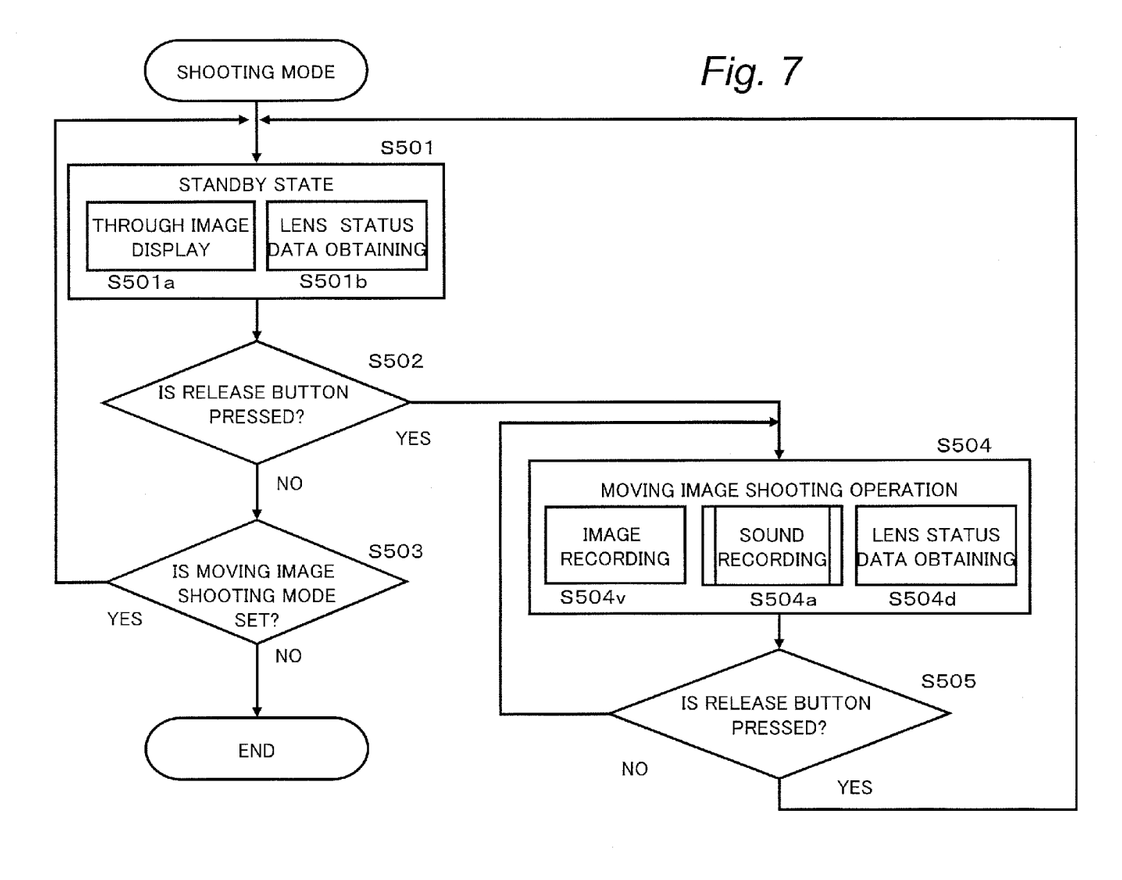
FIG. 7 is a flow chart describing a flow of an operation in an moving image shooting mode of the digital camera according to the first embodiment.

FIG. 7 is a flow chart describing the overall flow of the operation of the digital camera 100 in the moving image shooting mode. When the digital camera 100 is powered on by the user operating the power switch 183 with the mode dial 184 indicating the moving image shooting mode, the digital camera 100 performs the initial operation before entering the standby state of the moving image shooting mode (S501). In the standby state, a through image displaying process (S501*a*) and a lens status data obtaining process (S501*b*) are performed. In the through image displaying process (S501*a*), the controller 130 displays the through image output from the digital image/sound processor 120 on the display unit 190. In the lens status data obtaining process (S501*b*), the controller 130 requests lens status data indicating the state of the interchangeable lens 301 from the lens controller 320. The lens status data includes, for example, information on the current focal length by the zoom lens 312, position information of the focus lens 310, aperture value information of the diaphragm 316, and operation ring operation information indicating that the operation ring 315 is operated. In response to the request, the lens controller 320 sends the requested lens status data to the controller 130.

In the standby state, the controller 130 determines whether the release button 181 is pressed (step S502).

When the controller 130 determines that the release button 181 is pressed (Yes in step S502), the controller 130 transitions to the moving image shooting operation (S504). The moving image shooting operation includes a lens status data obtaining operation (S504*d*), an image recording operation (S504*v*), and a sound recording operation (S504*a*). In the moving image shooting operation (S504), a recording process of, for example, image information and sound signals for one frame period is performed. Note that, one frame period is the reciprocal of the frame rate in shooting a moving image such that when the frame rate is 60 frame/second, one frame period is 1/60 second. In the lens status data obtaining operation (S504d), the controller 130 requests the lens status data indicating the state of the interchangeable lens 301 from the lens controller 320. In response to the request, the lens controller 320 sends the requested lens status data to the controller 130. The controller 130 stores the obtained lens status data to the ROM 170 as required. Since the image recording operation (S504v) has been outlined in the description of the configuration, a detailed description thereof is omitted. The sound recording operation (S504a) will be described in detail later.

After the moving image shooting operation, the controller 130 determines whether the release button 181 is pressed (step S505). When the controller 130 determines that the release button 181 is not pressed (No in step S505), the controller 130 returns to step S504 and performs the moving image shooting operation for the next one frame period. On the other hand, when the controller 130 determines that the release button 181 is pressed (Yes in step S505), the controller 130 finishes the moving image shooting operation (S504) and transitions to the standby state (S501). As such, in the moving image shooting mode, the digital camera 100 performs the moving image shooting operation since the release button 181 is pressed until the release button 181 is pressed again.

On the other hand, when the controller 130 determines that the release button 181 is not pressed in step S502, the controller 130 determines a type of the shooting mode (S503). That is, the controller 130 determines whether the current operation mode is the moving image shooting mode (step S503). When the controller 130 determines that the operation mode is the moving image shooting mode (Yes in step S503), the controller 130 returns to step S501 which is the starting point of the moving image shooting mode. On the other hand, when the controller 130 determines that the operation mode is not the moving image shooting mode (No in step S503), the controller 130 finishes the operation of the moving image shooting mode.

2-3-1. Sound Recording Operation in Moving Image Shooting

Figure 8:
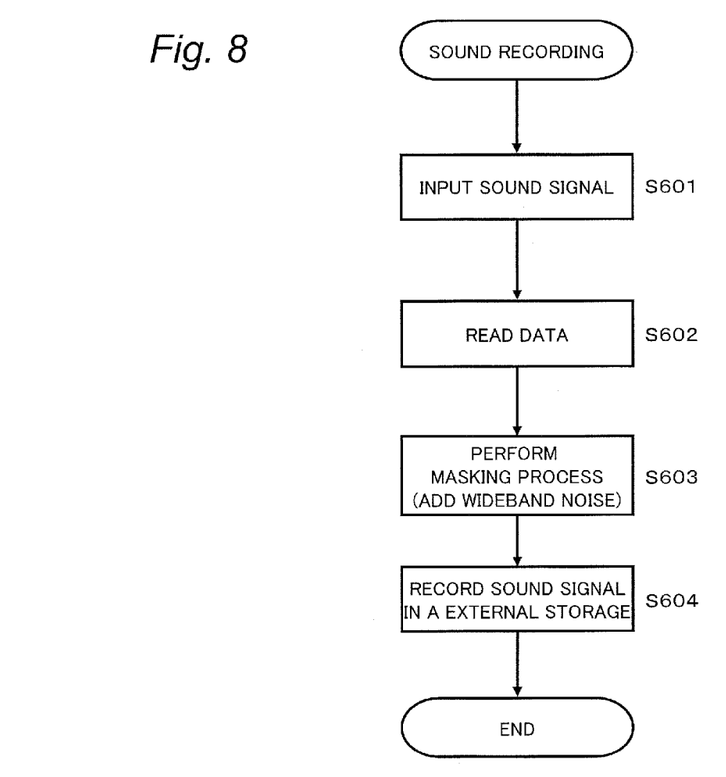
FIG. 8 is a flow chart describing a flow of a sound recording operation of the digital camera according to the first embodiment.

FIG. 8 is a flow chart describing the process of the sound recording operation (step S504a) in the flow chart of FIG. 7. The process of the sound recording operation will be described below.

The analog sound processor 115 receives the sound signal output from the sound pickup unit ill, performs respective types of analog signal processing on the signal, and outputs the result to the digital image/sound processor 120 (S601). The noise floor of the sound signal at this moment corresponds to Nf of FIG. 6A to FIG. 6C.

The controller 130 accesses the ROM 170 and reads the data of the masking setting obtained from the lens type and the masking setting table (S602).

The controller 130 notifies the digital image/sound processor 120 of the level of the wideband noise according to the read masking setting. The digital image/sound processor 120 performs the masking process by superimposing (adding) the wideband noise of the notified level on (to) the sound signal which is input from the sound pickup unit 111 and subject to the respective types of analog signal processing (S603). Note that the masking process is performed when attachment of the interchangeable lens 301 is detected, and not performed when attachment of the interchangeable lens 301 is not detected.

The controller 130 records the sound signal after the masking process in the external storage medium (S604). The noise floor of the sound signal after the masking process corresponds to Nf' of FIG. 6A to FIG. 6C.

As described above, by performing the masking process adapted to the noise characteristic of the interchangeable lens 301, the lens noise can be made less unpleasant to the ear even in shooting the moving image with an interchangeable lens which produces a big lens noise. Also, by performing the masking process adapted to the noise characteristic of the interchangeable lens 301, the noise which can be unpleasant to the ear can be reduced without needlessly impairing the SN ratio of the sound signal in shooting the moving image with an interchangeable lens which produces a small lens noise.

3. Summary

As described above, the camera body 102 of the digital camera 100 of the embodiment includes the controller 130 which detects attachment of the interchangeable lens 301, the COD image sensor 143 which captures a subject image incident through the interchangeable lens 301 and outputs image data, the sound pickup unit 111 which picks up a sound and outputs a sound signal, and the digital image/sound processor 120 which, in response to detection of attachment of the interchangeable lens 301, adds a wideband noise to the sound signal output from the sound pickup unit 111 and outputs the result.

As such, by performing the masking process adapted to the noise characteristic of the interchangeable lens 301, an imaging device can be provided which can make the lens noise less unpleasant to the ear even in shooting the moving image with an interchangeable lens which could produce a big lens noise. Also, the masking process adapted to the noise characteristic of the interchangeable lens 301 provides an imaging device which can be provided which does not needlessly impair the SN ratio of the sound signal in shooting the moving image with an interchangeable lens which could produces a small lens noise.

OTHER EMBODIMENTS

The present disclosure is not limited to the above described embodiment and various embodiments are possible. Examples of other embodiments will be summarized below.

In the above described embodiment, the external apparatus to be attached is described as an interchangeable lens. That is, it has been described that the controller 130 detects attachment of the interchangeable lens 301 and performs the masking process according to the lens type of the attached interchangeable lens. However, the controller 130 may detect attachment of an external apparatus other than the interchangeable lens and performs the masking process according to the type of the external apparatus. The external apparatus may be any apparatus as far as it produces an operation noise due to its action, such as a camera platform, for example, which can support the digital camera 100 and pan or tilt the digital camera 100 by driving a motor.

In the above described embodiment, the imaging device including the sound pickup device is described by taking a digital camera 100 as an example. However, the imaging device including the sound pickup device may be any apparatus as long as the imaging device has an interchangeable lens and can take the moving image (can record the sound). That is, the imaging device may be a video camera.

In the above described embodiment, the digital image/sound processor 120 and the controller 130 are described as having the above described functions and configurations respectively. However, they may be configured to have their functions and configurations partially common to each other.

Although the CCD image sensor 143 is described as an example of the imaging unit in the above described embodiment, the imaging unit is not limited to that. That is, the imaging unit may be another imaging device such as a CMOS image sensor or an NMOS image sensor.

According to the technology disclosed here, a sound pickup device which improves the quality of sound data in terms of audibility can be provided, therefore, the technology can also be applied to digital cameras and movie cameras.

The invention claimed is:

1. An imaging device to which an interchangeable lens is mountable, comprising:
   a detector configured to detect attachment of the interchangeable lens;
   an imaging unit configured to capture a subject image incident through the interchangeable lens and output image data;
   a sound pickup unit configured to pick up a sound and output a sound signal;
   a noise processor configured to, in response to detection of attachment of the interchangeable lens by the detector, superimpose a wideband noise signal to the sound signal output from the sound pickup unit and output the sound signal including the wideband noise signal superimposed thereto; and
   a memory device configured to store a masking setting table which associates characteristic information indicating characteristic of the interchangeable lens with a wideband noise;
   wherein the detector obtains the characteristic information from the interchangeable lens; and
   the noise processor selects a wideband noise to be superimposed on the output sound signal by referring to the masking setting table based on the characteristic information obtained from the interchangeable lens.

2. The imaging device according to claim 1, wherein the interchangeable lens has a mechanical driving unit that produces a noise when the mechanical driving unit is driven.

* * * * *